(12) United States Patent
Moore et al.

(10) Patent No.: US 8,198,384 B1
(45) Date of Patent: Jun. 12, 2012

(54) METHOD FOR PREVENTING OR REDUCING CLOGGING OF A FINES EJECTOR

(75) Inventors: Glenn Edward Moore, Longview, TX (US); Jeremy Bruce Mann, Longview, TX (US)

(73) Assignee: Westlake Longview Corporation, Houston, TX (US)

( * ) Notice: Subject to any disclaimer, the term of this patent is extended or adjusted under 35 U.S.C. 154(b) by 53 days.

(21) Appl. No.: 12/987,951

(22) Filed: Jan. 10, 2011

(51) Int. Cl.
*C08F 2/00* (2006.01)
*B01J 8/18* (2006.01)

(52) U.S. Cl. .......... 526/68; 526/69; 526/70; 526/72; 422/139

(58) Field of Classification Search .......... 526/68, 526/69, 70, 72; 422/139
See application file for complete search history.

(56) References Cited

U.S. PATENT DOCUMENTS

| | | | |
|---|---|---|---|
| 3,944,534 A | 3/1976 | Sennari et al. | |
| 4,337,069 A | 6/1982 | German, Jr. et al. | |
| 4,640,963 A | 2/1987 | Kreider et al. | |
| 4,725,409 A | 2/1988 | Wolf | |
| 4,882,400 A | 11/1989 | Dumain et al. | |
| 5,382,638 A | 1/1995 | Bontemps et al. | |
| 5,428,118 A | 6/1995 | Painter et al. | |
| 5,693,727 A | 12/1997 | Goode et al. | |
| 5,777,120 A | 7/1998 | Jordan et al. | |
| 5,866,663 A | 2/1999 | Brookhart et al. | |
| 6,218,484 B1 | 4/2001 | Brown et al. | |
| 6,306,981 B1 | 10/2001 | Brown et al. | |
| 6,359,083 B1 | 3/2002 | Dooley et al. | |
| 6,624,266 B2 | 9/2003 | Terry et al. | |
| 6,818,187 B2 | 11/2004 | Govoni et al. | |
| 7,524,903 B2 | 4/2009 | Mei et al. | |
| 7,687,588 B2 | 3/2010 | Mei et al. | |
| 7,718,139 B2 | 5/2010 | Scott et al. | |
| 7,977,436 B2 * | 7/2011 | Scott et al. ............ 526/68 | |
| 2008/0021178 A1 | 1/2008 | Scott et al. | |
| 2009/0149610 A1 | 6/2009 | Sato et al. | |
| 2010/0099811 A1 | 4/2010 | Kobayashi et al. | |
| 2010/0143217 A1 | 6/2010 | Wonders et al. | |
| 2010/0190935 A1 | 7/2010 | Scott et al. | |

FOREIGN PATENT DOCUMENTS

| | | |
|---|---|---|
| EP | 0 089 691 | 9/1983 |
| FR | 2 137 441 | 12/1972 |
| JP | 57 128 706 | 8/1982 |
| JP | 09 316 108 | 12/1997 |
| WO | 97 14721 | 4/1997 |
| WO | 01 79306 A1 | 10/2001 |

OTHER PUBLICATIONS

International Search Report from Int'l Patent Appl. No. PCT/US2011/060582, pp. 1-3 (Jan. 27, 2012).
W.E. Grosso et al, "Modeling a Fluidized-Bed Reactor for the Catalytic Polymerization of Ethylene: Particle Size Distribution Effects," Latin American Applied Research, vol. 35, pp. 67-76 (2005).
English Abstract of JP 09 316 108.
English Abstract of JP 57 128 706.

(Continued)

*Primary Examiner* — William Cheung
(74) *Attorney, Agent, or Firm* — Phan Law Group PLLC

(57) ABSTRACT

A method for preventing or reducing clogging of a fines ejector in a gas-phase olefin polymerization process is disclosed. The process involves injecting a liquid into the motive gas stream entering the fines ejector.

20 Claims, 4 Drawing Sheets

OTHER PUBLICATIONS

Wang et al., Organometallics, 1998, vol. 17, pp. 3149-3151.
Small et al., Journal of the American Chemical Society, 1998, vol. 120, pp. 7143-7144.
Scollard et al., Journal of the American Chemical Society, 1996, vol. 118, pp. 10008-10009.

* cited by examiner

US 8,198,384 B1

METHOD FOR PREVENTING OR REDUCING CLOGGING OF A FINES EJECTOR

FIELD OF THE INVENTION

The invention generally relates to the field of gas-phase olefin polymerization.

BACKGROUND OF THE INVENTION

In a typical gas-phase, fluidized bed olefin polymerization process, fine polymer particles are carried overhead from the reactor and are removed from the recycle gas stream using cyclone or centrifugal separators. The collected fines are drawn from the bottom of the separator using an ejector and from there are returned to the reactor. Such a system is described in U.S. Pat. No. 4,882,400; the entire content of which is hereby incorporated by reference.

Ejectors discussed in the '400 patent have a horizontal design. A typical horizontally oriented fines ejector is shown in FIG. 1. In a typical horizontal fines ejector 10, a motive gas stream 11 enters the ejector 10 horizontally as shown in FIG. 1. The motive gas stream 11 provides a motive force to draw fines and gas 12 from the separator (not shown) into the ejector 10 and conveys them through outlet 13 back to the reactor (not shown) into which they are subsequently re-injected.

In a continuous gas-phase, fluidized bed polyolefin polymerization process, it is common that gas loop piping and equipment would foul to the extent that a shutdown is periodically required for cleaning. Fouling is especially severe in the horizontal fines ejector 10 as the polymer powder-laden gas stream 12 from the fines separators (not shown) is forced to change direction, typically 90°, within the ejector 10. The powder and sometimes even sheets of polymer tend to build-up in area 14 and reduce the efficiency or even plug the ejector 10.

Fouling is so severe in the conventional-design ejector that cleaning to remove polymer build-up is required on average every two months, resulting in frequent plant shutdowns, excessive cleaning expenses, and unacceptable lost production. In extreme cases, heavy fouling of ejector internals will significantly impede ejector performance and has resulted in flow blockages and unplanned reactor shutdowns.

To remedy this fouling problem, attempts have been made to improve the ejector design. One such attempt is described in U.S. Patent Appl. Publ. No. US 2008/0021178; the entire content of which is hereby incorporated by reference. Instead of using a horizontally oriented fines ejector, US '178 devised a vertically oriented fines ejector. While the vertically oriented fines ejector of US '178 ameliorates the fouling problem, the vertically oriented fines ejector is still susceptible to fouling or clogging periodically.

This invention aims to solve the fouling or clogging problems associated with horizontal and vertical fines ejectors.

SUMMARY OF THE INVENTION

In one aspect, the invention provides a method for preventing or reducing clogging of a fines ejector. The method comprises:

(a) providing a fines ejector that is clogging or is susceptible to clogging;

(b) passing a motive gas stream into a motive gas inlet of the fines ejector;

(c) passing an entrained gas stream comprising fine polymer particles into an entrained gas inlet of the fines ejector; and (d) introducing a liquid stream into the motive gas stream before the motive gas stream enters the fines ejector to prevent or reduce clogging of the fines ejector.

In another aspect, the invention provides a process for polymerizing olefins. The process comprises:

(a) contacting one or more olefins with a catalyst in a fluidized bed reactor under polymerization conditions to form an ascending gas stream comprising fine polymer particles and unreacted olefins;

(b) passing the ascending gas stream to a fines separator to separate the fine polymer particles from the unreacted olefins;

(c) passing the fine polymer particles from the fines separator into an entrained gas inlet of a fines ejector that is clogging or is susceptible to clogging;

(d) passing a motive gas stream into a motive gas inlet of the fines ejector to convey the fine polymer particles back to the fluidized bed reactor; and (e) introducing a liquid stream into the motive gas stream before the motive gas stream enters the fines ejector to prevent or reduce clogging of the fines ejector.

DETAILED DESCRIPTION OF THE INVENTION

Figure 1:
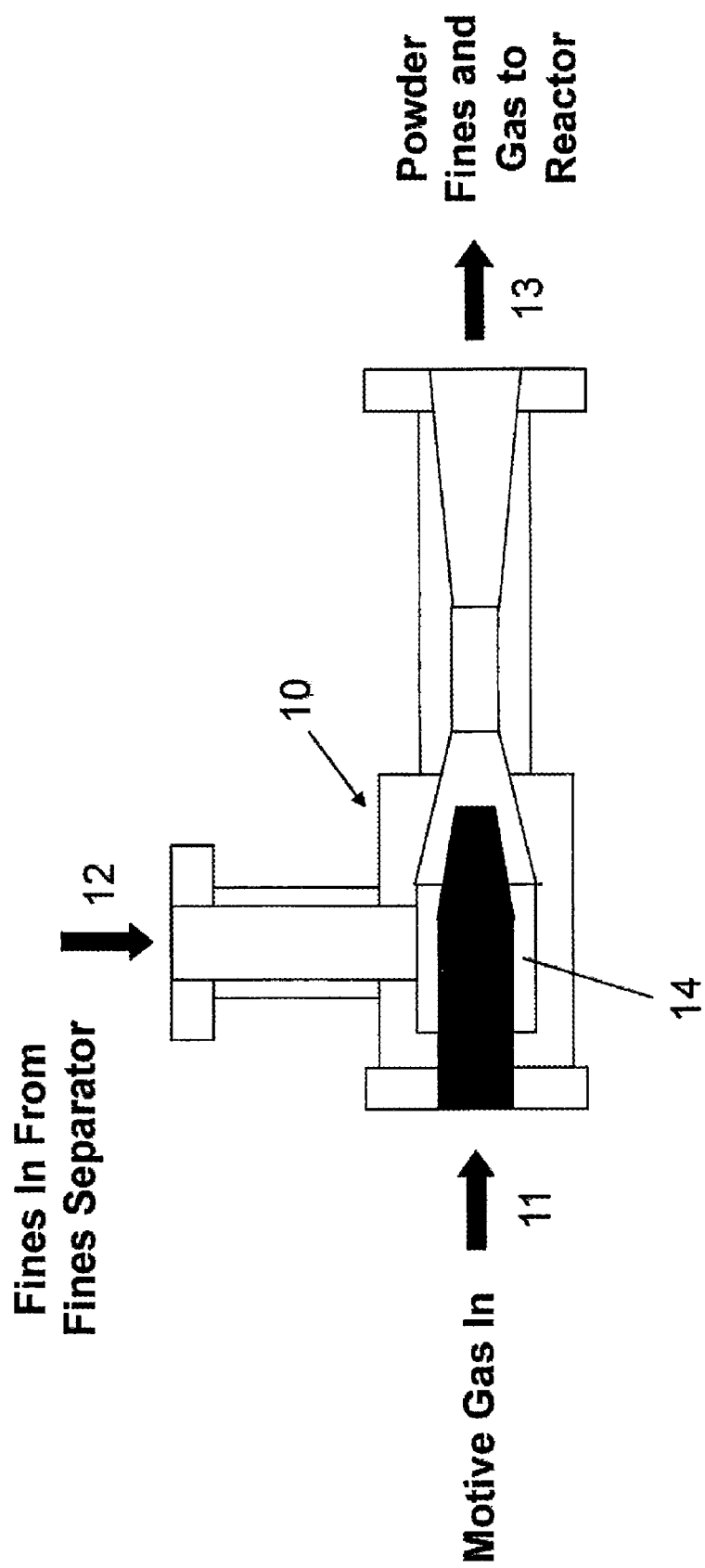
FIG. 1 is a cross-sectional view of a horizontally oriented fines ejector.

In a first aspect, the invention provides a method for preventing or reducing clogging of a fines ejector. The method comprises:

(a) providing a fines ejector that is clogging or is susceptible to clogging;

(b) passing a motive gas stream into a motive gas inlet of the fines ejector;

(c) passing an entrained gas stream comprising fine polymer particles into an entrained gas inlet of the fines ejector; and (d) introducing a liquid stream into the motive gas stream before the motive gas stream enters the fines ejector to prevent or reduce clogging of the fines ejector.

While not all fines ejectors used in gas-phase olefin polymerization processes clog or are susceptible to clogging, some do regardless of their design. The method of the invention is applicable to any fines ejector that has a history of clogging, is clogging, or is clogged. Clogging can be determined by visually inspecting the fines ejector or, more commonly, by detecting a reduced pressure or flowrate through the fines ejector over time.

Steps (b) and (c) of the method of the invention are conventional. Regardless of design, fines ejectors typically have a motive gas inlet, an entrained gas inlet, and a combined stream outlet. The fines ejectors may clog due to an accumulation or build-up of polymer powder and/or sheets within the ejectors.

When it is determined that the fines ejector is susceptible to clogging, is clogging, or clogged, it has been surprisingly discovered that the clogging can be reduced or prevented by injecting a liquid into the motive gas stream before the motive gas stream enters the fines ejector.

Any type of liquid can be used so long as it does not materially adversely affect the polymerization reaction. For example, the liquid can include an inert diluent such as ethane, propane, butane, pentane, hexane, heptane, toluene, etc. The liquid may also include a catalyst modifier such as water or tetrahydrofuran. The liquid may also include a reactant such as ethylene, propylene, butene, hexene, octene, etc. Preferably, the liquid includes a fresh α-olefin comonomer such as propylene, 1-butene, 1-pentene, 1-hexene, 1-heptene, 1-octene, etc. By "fresh," it is meant that that the liquid is not a compressed and cooled stream from the recycle loop.

In one embodiment, the liquid does not include gas from the recycle loop containing unreacted olefins that has been cooled and compressed.

In another embodiment, the liquid does include at least a portion of the gas from the recycle loop containing unreacted olefins from the recycle loop that has been cooled and compressed to form a liquid, provided that the liquefied recycle gas stream is used in an amount and for a duration sufficient to prevent and/or reduce clogging of the fines ejector.

The liquid may be injected continuously into the motive gas stream during operation of the fines ejector. Alternatively, the liquid may be injected intermittently into the motive gas stream, either at regular or irregular intervals, or on an as-needed basis.

The duration and amount of the liquid injected into the motive gas stream can vary over a wide range, depending on various factors such as the extent of the clogging and the limits for safe operation of the process equipment used, although the duration and amount should be sufficient so as to prevent and/or reduce clogging of the fines ejector during its operation. Typically, the liquid may be introduced at a mass flowrate of 1 to 10% of the mass flowrate of the motive gas stream. Alternatively, the liquid may be introduced at a mass flowrate of 3 to 7% of the mass flowrate of the motive gas stream.

The liquid may be introduced anywhere along the conduit for conveying the motive gas stream from its source to the motive gas inlet of the fines ejector. Typically, the liquid is introduced adjacent or in close proximity to the motive gas inlet to maximize the liquid's unclogging effect.

In a second aspect, the invention provides a process for polymerizing olefins. The process comprises:

(a) contacting one or more olefins with a catalyst in a fluidized bed reactor under polymerization conditions to form an ascending gas stream comprising fine polymer particles and unreacted olefins;

(b) passing the ascending gas stream to a fines separator to separate the fine polymer particles from the unreacted olefins;

(c) passing the fine polymer particles from the fines separator into an entrained gas inlet of a fines ejector that is clogging or is susceptible to clogging;

(d) passing a motive gas stream into a motive gas inlet of the fines ejector to convey the fine polymer particles back to the fluidized bed reactor; and (e) introducing a liquid stream into the motive gas stream before the motive gas stream enters the fines ejector to prevent or reduce clogging of the fines ejector.

The olefins suitable for use in the invention include, for example, those containing from 2 to 16 carbon atoms. The olefins can be polymerized to form homopolymers, copolymers, terpolymers, and the like. Particularly preferred for preparation herein are polyethylenes. Such polyethylenes include homopolymers of ethylene and copolymers of ethylene and at least one α-olefin wherein the ethylene content is at least 50% by weight of the total monomers involved. Exemplary α-olefins that may be utilized include propylene, 1-butene, 1-pentene, 1-hexene, 1-heptene, 1-octene, 4-methyl-1-pentene, 1-decene, 1-dodecene, 1-hexadecene, and the like. Also suitable herein are polyenes such as 1,3-hexadiene, 1,4-hexadiene, 1,5-hexadiene, cyclopentadiene, dicyclopentadiene, 4-vinylcyclohex-1-ene, 1,5-cyclooctadiene, 5-vinylidene-2-norbornene, 5-vinyl-2-norbornene, and olefins formed in situ in the polymerization medium. When olefins are formed in situ in the polymerization medium, the formation of polyethylenes containing long chain branching may occur.

In the present invention, any catalyst for polymerizing olefins may be used. Preferably, the olefin polymerization catalyst comprises at least one metal selected from Groups 3, 4, 5, 6, 7, 8, 9, 10, 11, 12 and 13 of the Periodic Table of the Elements. Exemplary metals include titanium, zirconium, vanadium, iron, chromium, nickel, and aluminum. The olefin polymerization catalyst may be neutral or cationic.

Exemplary of such polymerization catalysts are:

1. Any compound containing a Group 6 element. Preferred are chromium containing compounds. Exemplary are chromium oxide catalysts which polymerize ethylene to high molecular weight high density polyethylenes (HDPE) having a broad molecular weight distribution. These catalysts are typically based on Cr(6+) and are supported on a carrier. Further exemplary are organochromium catalysts such as bis(triphenylsilyl)chromate supported on silica and activated with organoaluminum compounds, and bis(cyclopentadienyl)chromium supported on silica.

2. Ziegler-Natta catalysts which typically contain a transition metal component and an organometallic co-catalyst such as an organoaluminum compound.

3. An olefin polymerization catalyst that polymerizes olefins to produce interpolymers of olefins having a molecular weight distribution (MWD) of from 1 to 2.5.

4. Metallocene catalysts which contain a transition metal component having at least one moiety selected from substituted or unsubstituted cyclopentadienyl, substituted or unsubstituted pentadienyl, substituted or unsubstituted pyrrole, substituted or unsubstituted phosphole, substituted or unsubstituted arsole, substituted or unsubstituted boratabenzene, and substituted or unsubstituted carborane, and an organometallic co-catalyst that is typically alkyl aluminoxane, such as methyl aluminoxane, or an aryl substituted boron compound.

5. Any compound containing a Group 13 element. Preferred are aluminum containing compounds. Exemplary are catalysts of the type described in U.S. Pat. No. 5,777,120, such as cationic aluminum alkyl amidinate complexes with an organometallic co-catalyst that is typically alkylaluminoxane, such as methylaluminoxane, or an aryl substituted boron containing compound.

6. Any compound containing a Group 10 element. Preferred are nickel containing compounds. Exemplary are catalysts of the type described in U.S. Pat. No. 5,866,663, such as cationic nickel alkyl diimine complexes with an organometallic co-catalyst that is typically alkylaluminoxane, such as methylaluminoxane, or an aryl substituted boron containing compound. Further exemplary are catalysts of the type described in Organometallics, 1998, Volume 17, pages 3149-3151, such as neutral nickel alkyl salicylaldiminato complexes.

7. Any compound containing a Group 8 element. Preferred are iron containing compounds. Exemplary are catalysts of the type described in the Journal of the American Chemical Society, 1998, Volume 120, pages 7143-7144, such as cationic iron alkyl pyridinebisimine complexes with an organometallic co-catalyst that is typically alkylaluminoxane, such as methylaluminoxane, or an aryl substituted boron containing compound.

8. Any compound containing a Group 4 element. Preferred are titanium and zirconium containing compounds. Exemplary are catalysts of the type described in the Journal of the American Chemical Society, 1996, Volume 118, pages 10008-10009, such as cationic titanium alkyl diamide complexes with an organometallic co-catalyst that is typically alkylaluminoxane, such as methylaluminoxane, or an aryl substituted boron containing compound.

The above catalysts are, or can be, supported on inert porous particulate carriers, known in the art.

Any fluidized bed reactor for polymerizing olefins may be used in the process of the present invention. Typically, such a fluidized bed reactor comprises a reaction zone and a so-called velocity reduction zone. The reaction zone comprises a bed of growing polymer particles, formed polymer particles, and a minor amount of catalyst particles fluidized by a continuous flow of gaseous monomer and diluent to remove heat of polymerization from the reaction zone. A suitable rate of gas flow may be readily determined by simple experiment.

The polymerization is generally carried out at a pressure of 0.5 to 5 MPa, and at a temperature of from 30° C. to 150° C. The gas mixture passing through the fluidized bed polymerization reactor may contain, among the olefin(s) to be polymerized, dienes, hydrogen, and a gas that is inert towards the catalyst such as nitrogen, methane, ethane and/or propane. The gas mixture passes through the fluidized bed as a rising stream, with a fluidization velocity that is generally between 2 and 8 times the minimum fluidization velocity, e.g., between 0.2 and 0.8 m/s.

An ascending gas stream, which comprises entrained polymer particles and unreacted olefins, leaving the reaction zone is passed to the velocity reduction zone where entrained particles are removed. Finer entrained polymer particles and dust in the ascending gas stream are passed to a fines separator such as a cyclone and/or fine filter to separate the fine polymer particles from the unreacted olefins. The gas containing unreacted olefins from the fines separator can then be passed through a heat exchanger wherein the heat of polymerization is removed, compressed in a compressor, and then returned to the reaction zone in a recycle loop. Optionally, some of the recirculated gases may be cooled and compressed to form liquids that increase the heat removal capacity of the circulating gas stream when readmitted to the reaction zone.

According to the invention, the fine polymer particles separated from the unreacted olefins are passed to a fines ejector. The fines ejector can be of any configuration, such as a horizontally oriented fines ejector or a vertically oriented fines ejector.

A motive gas is introduced into the fines ejector to convey the fine polymer particles back to the fluidized bed reactor. The motive gas may contain a gas that is inert towards the catalyst employed during the polymerization reaction, such as nitrogen. The motive gas may also contain the olefins that are introduced into the reactor. Preferably, a fraction of the gas from the recycle loop containing unreacted olefins that has been cooled and compressed is used as part of or all of the motive gas.

In one embodiment, a fraction of the gas from the recycle loop containing unreacted olefins is cooled and compressed to form a liquid. This liquid may be re-injected into the motive gas stream in order to prevent or reduce clogging of the fines ejector.

In another embodiment, the liquid does not include gas from the recycle loop containing unreacted olefins that has been cooled and compressed.

Other embodiments described above in relation of the method of the invention would be applicable to the process for polymerization aspect of the invention and are hereby incorporated by reference.

Bearing in mind the fact that the fine polymer particles reintroduced into the fluidized bed reactor can contain a high-activity catalyst, it is preferred to use a motive gas whose temperature is at least 15° C. lower than the polymerization temperature in the fluidized bed reactor. This is particularly preferred when the motive gas contains at least one olefin in order to avoid a premature polymerization reaction in the fines ejector or in the reintroduction pipework, which could cause blocking of the ejector or pipework.

Figure 2:
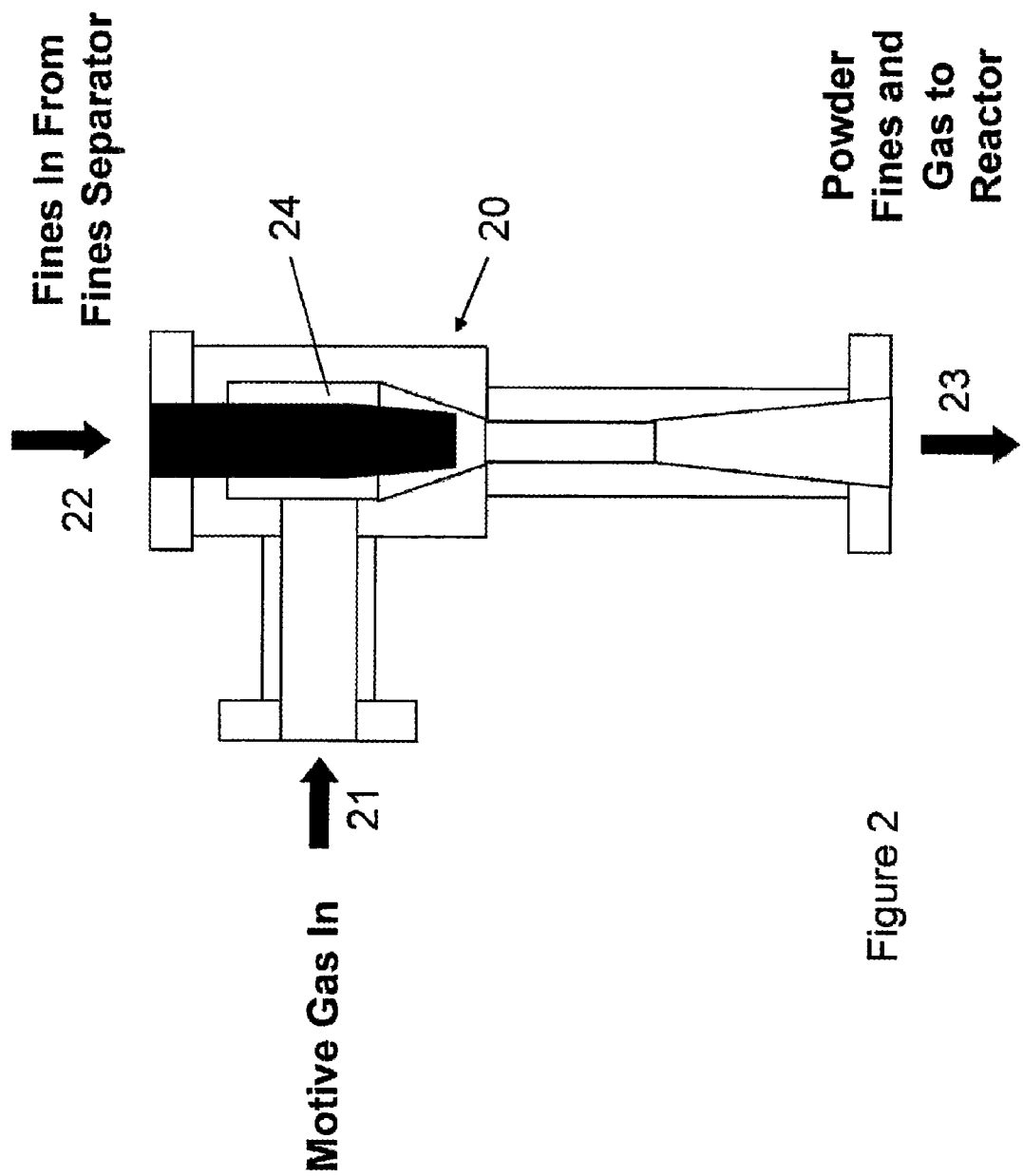
FIG. 2 is a cross-sectional view of a vertically oriented fines ejector.

In one embodiment of the invention, a vertically oriented fines ejector is used, which has the configuration shown in FIG. 2. In FIG. 2, fine polymer particles and gas 22 exiting the fines separator (not shown) enter the vertically oriented fines ejector 20 in a substantially vertical direction. Motive gas 21 is introduced into the fines ejector 20 as an annular stream 24, which envelops the stream of fine polymer particles 22 entering the ejector 20 and propels the particles 23 in a substantially vertical direction back to the fluidized bed reactor. In ejector 20, both the entering fine polymer particles 22 and the exiting particles 23 travel in substantially the same general direction so that there is minimal or no internal surface area for the fine polymer particles to collect and build up in to cause unwanted fouling and plugging of the ejector 20. Additionally, since the powder-laden gas 22 entering the converging section of the ejector is conveyed in an annular envelop of the motive gas 24, there is minimal contact between the polymer particles and the ejector internal surfaces.

Figure 3:
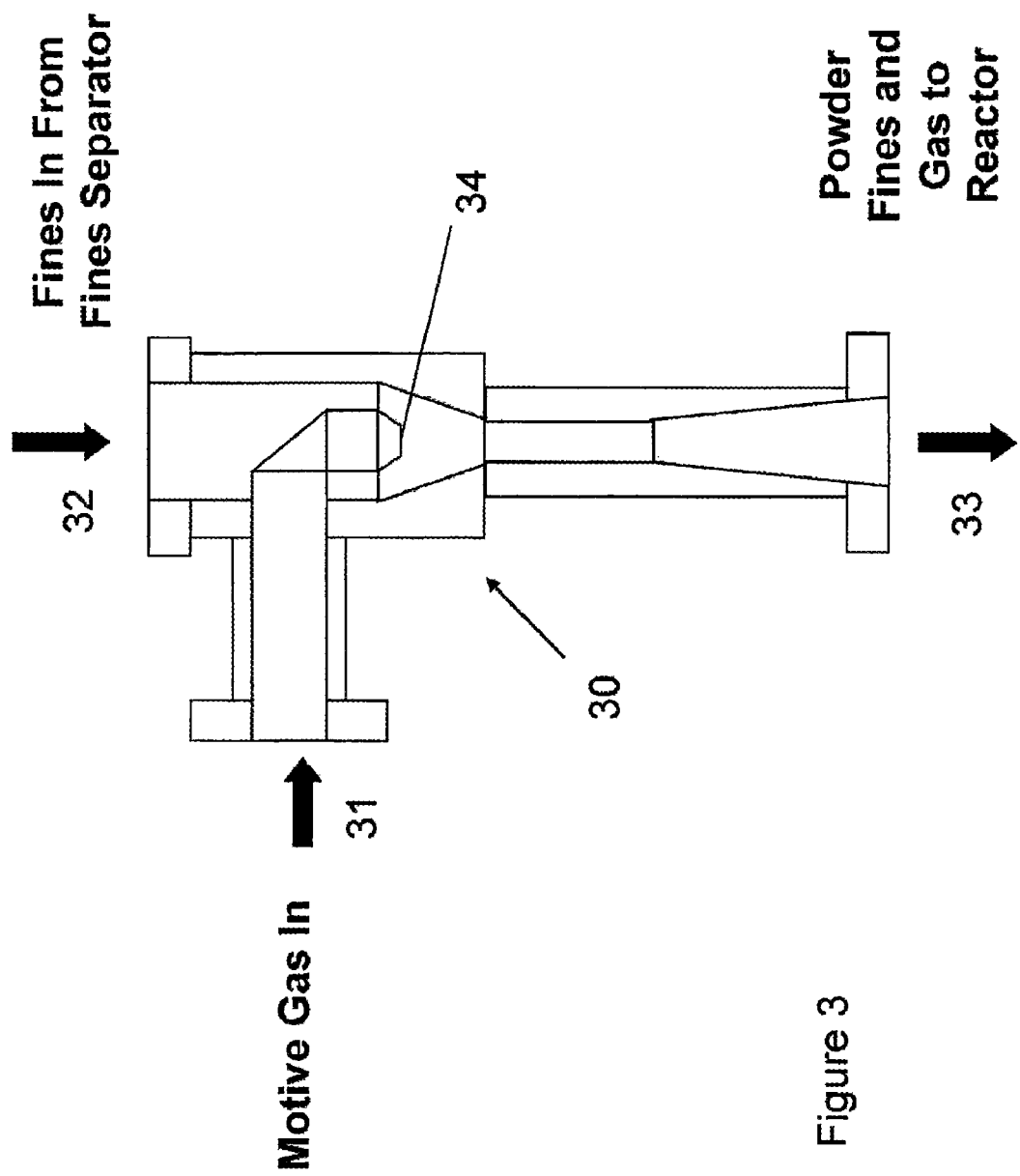
FIG. 3 is a cross-sectional view of another vertically oriented fines ejector.

In another embodiment of the invention, the vertically oriented fines ejector has the configuration shown in FIG. 3. In FIG. 3, fine polymer particles and gas 32 exiting the fines separator (not shown) enter the vertically oriented fines ejector 30 in a substantially vertical direction. Motive gas 31 is introduced into the fines ejector 30 through nozzle 34 as a stream inside of the stream of flowing fine polymer particles 32 entering the ejector 30. The motive gas 31 propels the particles 33 in a substantially vertical direction back to the fluidized bed reactor. In ejector 30, both the entering fine polymer particles 32 and the exiting particles 33 travel in substantially the same general direction so that there is minimal or no area for the fine polymer particles to collect and build up in to cause unwanted fouling and plugging of the ejector 30.

The motive gas is supplied in an amount sufficient to provide the compression needed to pull streams 12, 22, or 32 from the fines separator and to deliver streams 13, 23, and 33 to the reactor. The precise amount depends on the particular process conditions and equipment employed, but may be determined by persons skilled in the art.

In one embodiment, as seen in FIG. 2, the vertically oriented fines ejector 20 comprises an annulus 24 for introducing an annular stream of a motive gas 21 around a stream of the fine polymer particles 22.

In another embodiment, as seen in FIG. 3, the vertically oriented fines ejector 30 comprises a nozzle 34 for introducing a motive gas 31 inside a stream of the fine polymer particles 32.

This invention can be further illustrated by the following examples and comparative examples, although it will be understood that these examples are included merely for purposes of illustration and are not intended to limit the scope of the invention.

EXAMPLES

In the following examples, a commercial-scale, gas-phase olefin polymerization process was run in an apparatus substantially as shown diagrammatically in FIG. 1 of U.S. Pat. No. 4,882,400. The actual apparatus used has two cyclone separators arranged in series in the recycle loop immediately after the disengaging zone of the fluidized-bed reactor. Each cyclone separator was equipped with a vertically oriented fines ejector.

A sidestream was drawn from the recycle gas loop after the compressor to provide the motive gas for the fines ejectors.

Example 1

A linear low-density polyethylene production run was performed according to the process described above. The motive gas flow through the ejectors was approximately 38,000 lbs/hr. Once-per-day, during the entire production run, liquid 1-hexene was injected into the motive gas stream of one of the fines ejectors that was susceptible to clogging. The liquid hexene was introduced into the motive gas stream immediately upstream of where the gas stream entered the ejector. The liquid hexene was drawn as a sidestream from the hexene feedstream to the reactor loop.

The liquid hexene was at ambient temperature and approximately 350 psig pressure (feed pumps were used to maintain constant flow to the reactor, which was run at approximately 300 psig). The liquid hexene was introduced at 1,500 to 2,000 lb/hr for approximately 15 minutes each day during the production run. The temperature of the gas exiting the ejector was monitored to ensure that the amount and duration of the hexene injection did not drop the temperature below the calculated dew point of the stream in order to avoid forming a slurry.

The motive gas flow through the ejector did not decline significantly during the production run—allowing the process to run until a planned annual shutdown occurred.

Comparative Example 1

A linear low-density polyethylene production run was performed as described in Example 1, except that no liquid hexene was introduced into the motive gas stream of either fines ejectors.

After 71 days of operation, one of the ejectors had fouled to the extent that insufficient motive gas flow was occurring—causing major parts of the fines recycle system to suddenly plug, which required an immediate shutdown of the process.

Figure 4:
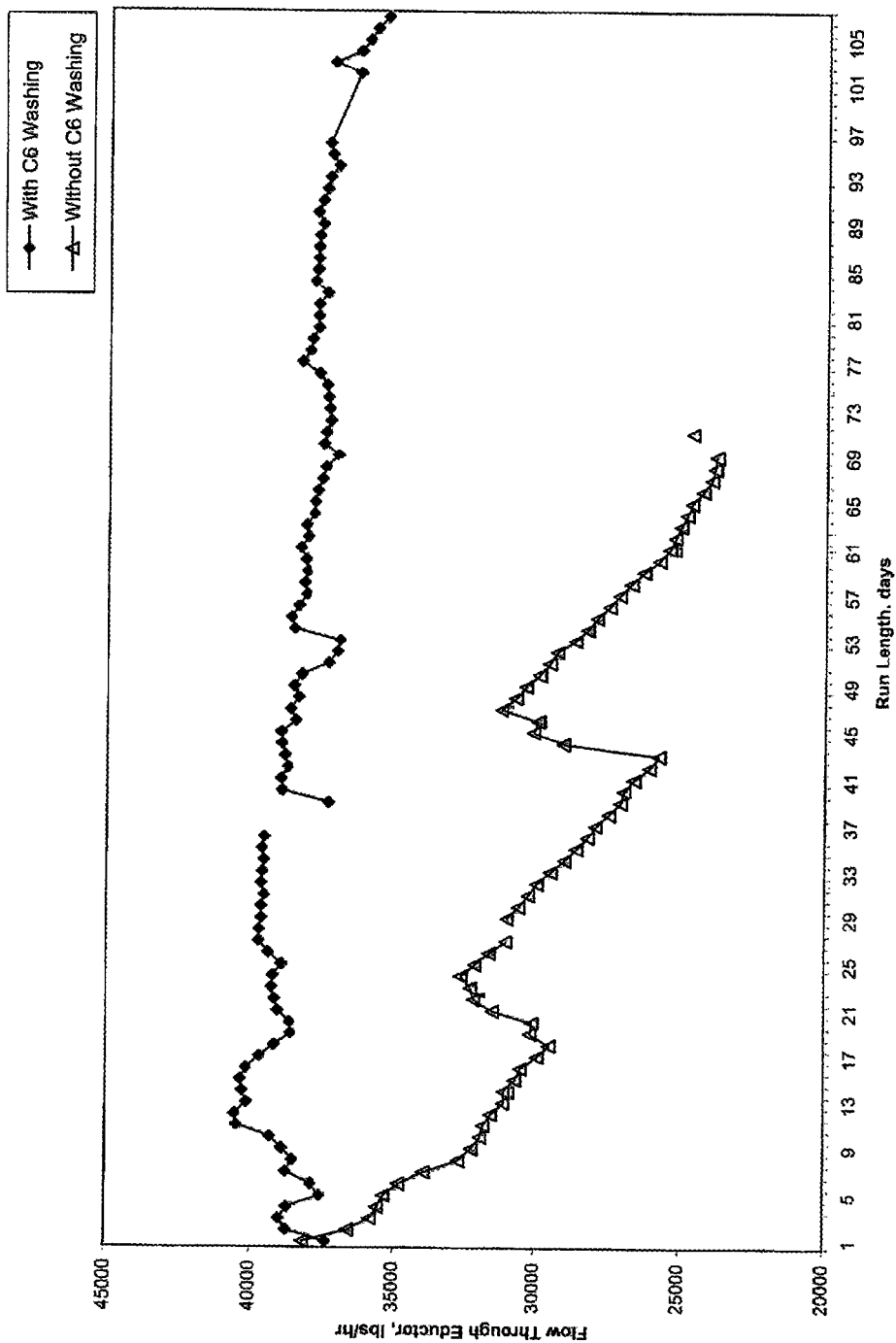
FIG. 4 is a graph of the motive gas flow rate through the ejectors in Example 1 and Comparative Example 1 over time.

FIG. 4 is a graph of the mass flow rate of the motive gas stream through one of the ejectors in Example 1 and Comparative Example 1 over time. As seen in FIG. 4, the motive gas flow rate through the ejector without the liquid hexene injection declined over time, while the motive gas flow rate through the ejector with the liquid hexene injection held relatively steady over time.

The invention has been described in detail with particular reference to preferred embodiments thereof, but it will be understood that variations and modifications can be effected within the spirit and scope of the invention.

We claim:

1. A method for preventing or reducing clogging of a fines ejector, comprising:
   (a) providing a fines ejector that is clogging or is susceptible to clogging;
   (b) passing a motive gas stream into a motive gas inlet of the fines ejector;
   (c) passing an entrained gas stream comprising fine polymer particles into an entrained gas inlet of the fines ejector; and
   (d) introducing a liquid stream into the motive gas stream before the motive gas stream enters the fines ejector to prevent or reduce clogging of the fines ejector.

2. The method according to claim 1, wherein the liquid stream is introduced continuously into the motive gas stream.

3. The method according to claim 1, wherein the liquid stream is introduced intermittently into the motive gas stream.

4. The method according to claim 3, wherein the liquid stream is introduced into the motive gas stream at regular intervals.

5. The method according to claim 3, wherein the liquid stream is introduced into the motive gas stream at irregular intervals.

6. The method according to claim 1, wherein the liquid stream comprises a monomer, a catalyst modifier, an inert compound, or combinations thereof.

7. The method according to claim 6, wherein the liquid stream comprises fresh monomer.

8. The method according to claim 7, wherein the fresh monomer comprises 1-hexene.

9. The method according to claim 1, wherein the liquid stream is introduced at a mass flowrate of 1 to 10% of the mass flowrate of the motive gas stream.

10. The method according to claim 9, wherein the mass flowrate of the liquid stream is 3 to 7% of the mass flowrate of the motive gas stream.

11. A process for polymerizing olefins, comprising:
    (a) contacting one or more olefins with a catalyst in a fluidized bed reactor under polymerization conditions to form an ascending gas stream comprising fine polymer particles and unreacted olefins;
    (b) passing the ascending gas stream to a fines separator to separate the fine polymer particles from the unreacted olefins;
    (c) passing the fine polymer particles from the fines separator into an entrained gas inlet of a fines ejector that is clogging or is susceptible to clogging;
    (d) passing a motive gas stream into a motive gas inlet of the fines ejector to convey the fine polymer particles back to the fluidized bed reactor; and
    (e) introducing a liquid stream into the motive gas stream before the motive gas stream enters the fines ejector to prevent or reduce clogging of the fines ejector.

12. The process according to claim 11, wherein the liquid stream is introduced continuously into the motive gas stream.

13. The process according to claim 11, wherein the liquid stream is introduced intermittently into the motive gas stream.

14. The process according to claim 13, wherein the liquid stream is introduced into the motive gas stream at regular intervals.

15. The process according to claim 13, wherein the liquid stream is introduced into the motive gas stream at irregular intervals.

16. The process according to claim 11, wherein the liquid stream comprises an olefin, a catalyst modifier, an inert compound, or combinations thereof.

17. The process according to claim 16, wherein the liquid stream comprises one or more fresh olefins.

18. The process according to claim 17, wherein the fresh olefins comprise 1-hexene.

19. The process according to claim 11, wherein the liquid stream is introduced at a mass flowrate of 1 to 10% of the mass flowrate of the motive gas stream.

20. The process according to claim 19, wherein the mass flowrate of the liquid stream is 3 to 7% of the mass flowrate of the motive gas stream.

* * * * *